US012623214B2

(12) United States Patent
Lee et al.

(10) Patent No.: US 12,623,214 B2
(45) Date of Patent: May 12, 2026

(54) GENE AMPLIFICATION CHIP, APPARATUS FOR GENE AMPLIFICATION, AND APPARATUS FOR BIO-PARTICLE ANALYSIS

(71) Applicant: SAMSUNG ELECTRONICS CO., LTD., Suwon-si (KR)

(72) Inventors: Jae Hong Lee, Suwon-si (KR); Kak Namkoong, Seoul (KR); Hyeong Seok Jang, Seoul (KR); Won Jong Jung, Suwon-si (KR); Hyung Jun Youn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 841 days.

(21) Appl. No.: 17/954,559

(22) Filed: Sep. 28, 2022

(65) Prior Publication Data

US 2023/0381772 A1 Nov. 30, 2023

(30) Foreign Application Priority Data

May 27, 2022 (KR) ........................ 10-2022-0065218

(51) Int. Cl.
*B01L 3/00* (2006.01)
*B01L 7/00* (2006.01)

(52) U.S. Cl.
CPC ............... *B01L 3/5027* (2013.01); *B01L 7/52* (2013.01); *B01L 2200/10* (2013.01);
(Continued)

(58) Field of Classification Search
CPC ...... B01L 3/5027; B01L 7/52; B01L 2200/10; B01L 2200/147; B01L 2300/0819;
(Continued)

(56) References Cited

U.S. PATENT DOCUMENTS 10,766,034 B2 9/2020 Lee et al.
11,130,993 B2 9/2021 Lee et al.
(Continued)

FOREIGN PATENT DOCUMENTS

JP 2006-229168 A 8/2006
JP 6732313 B2 7/2020
(Continued)

OTHER PUBLICATIONS

Kang et al, "Ultrafast and Real-Time Nanoplasmonic On-Chip Polymerase Chain Reaction for Rapid and Quantitative Molecular Diagnostics" ACS Nano, May 19, 2021, 15, 10194-10202 (Year: 2021).*

*Primary Examiner* — Dennis White
(74) *Attorney, Agent, or Firm* — Sughrue Mion, PLLC

(57) ABSTRACT

A gene amplification chip may include: a cover layer having a solution inlet through which a sample solution to be injected; a chamber layer disposed on one surface of the cover layer, and having a chamber to receive the sample solution when the sample solution is injected through the solution inlet such that an amplification reaction of the sample solution occurs in the chamber; a bottom layer disposed on another surface of the chamber layer; and a photothermal film attached to an outer surface of the bottom layer, and configured to convert light into heat to heat the sample solution received in the chamber.

20 Claims, 21 Drawing Sheets

(52) U.S. Cl.
CPC . *B01L 2200/147* (2013.01); *B01L 2300/0819* (2013.01); *B01L 2300/1816* (2013.01)

(58) Field of Classification Search
CPC ..... B01L 2300/1816; B01L 2300/0816; B01L 2300/0829; B01L 2300/168; B01L 2300/1861; B01L 2400/0406; B01L 2400/0487; B01L 2400/0688; B01L 3/502715; B01L 2200/0663; B01L 2200/0684; B01L 2300/0851; B01L 2300/1855
See application file for complete search history.

(56) References Cited

U.S. PATENT DOCUMENTS

| | | | | |
|---|---|---|---|---|
| 11,203,019 | B2 | 12/2021 | Son et al. | |
| 11,406,983 | B2 | 8/2022 | Lee et al. | |
| 2020/0038871 | A1* | 2/2020 | Barany | B01L 7/52 |
| 2020/0114363 | A1 | 4/2020 | Son | |
| 2021/0205816 | A1 | 7/2021 | Jeong et al. | |
| 2021/0340482 | A1 | 11/2021 | Matsumoto | |
| 2022/0042073 | A1 | 2/2022 | Lee et al. | |

FOREIGN PATENT DOCUMENTS

| | | | |
|---|---|---|---|
| KR | 10-2065720 | B1 | 1/2020 |
| KR | 10-2220637 | B1 | 3/2021 |
| KR | 10-2292998 | B1 | 8/2021 |
| KR | 10-2312555 | B1 | 10/2021 |
| KR | 10-2022-0001404 | A | 1/2022 |

* cited by examiner

GENE AMPLIFICATION CHIP, APPARATUS FOR GENE AMPLIFICATION, AND APPARATUS FOR BIO-PARTICLE ANALYSIS

CROSS-REFERENCE TO RELATED APPLICATION(S)

This application claims priority from Korean Patent Application No. 10-2022-0065218, filed on May 27, 2022, in the Korean Intellectual Property Office, the disclosure of which is incorporated herein by reference in their entireties.

BACKGROUND

1. Field

Apparatuses and methods consistent with example embodiments relate to a gene amplification chip, an apparatus for gene amplification, and an apparatus for bio-particle analysis.

2. Description of the Related Art

Clinical or environmental samples are analyzed by a series of biochemical, chemical, and mechanical treatment processes. Recently, there has been much interest in developing techniques for diagnosis or monitoring of biological samples. Molecular diagnostic methods based on nucleic acid amplification techniques have excellent accuracy and sensitivity, and thus are increasingly used in various applications, ranging from diagnosis of infectious diseases or cancer to pharmacogenomics, development of new drugs, and the like.

The polymerase chain reaction (PCR) is a technique for nucleic acid amplification, which has been widely used as a core technology in molecular biological diagnostic methods. The PCR is a method of detecting a target nucleic acid by amplifying a specific nucleic acid sequence, in which heating and cooling processes are repeated to activate or inhibit an enzyme for copying nucleic acid sequences. By gene amplification, the PCR can detect the presence of a target DNA sequence in a sample, and research is conducted for simplifying the PCR process to reduce time and provide user convenience, and manufacturing a PCR system in a compact size for application in point-of-care testing or personal testing.

SUMMARY

According to an aspect of the present disclosure, a gene amplification chip may include: a cover layer having a solution inlet through which a sample solution to be injected; a chamber layer disposed on one surface of the cover layer, and having a chamber configured to receive the sample solution when the sample solution is injected through the solution inlet such that an amplification reaction of the sample solution occurs in the chamber; a bottom layer disposed on another surface of the chamber layer; and a photothermal film attached to an outer surface of the bottom layer, and configured to convert light into heat to heat the sample solution received in the chamber.

The photothermal film may be formed as a flat surface and is attached to all or a portion of the outer surface of the bottom layer.

The photothermal film may have a thickness of 500 μm or less.

The photothermal film may be formed of at least one of polymer, metal, metal oxide, nanocomposite, nanostructure, and semiconductor.

The cover layer may include at least one of silicon, metal, glass, and polymer.

The chamber layer and the bottom layer may be integrally formed using at least one of silicon, metal, and polymer, or are separately formed using different materials.

A sum of a thicknesses of the chamber layer and a thicknesses the bottom layer may be 1 mm or less.

The chamber may have a single space to receive the sample solution therein, and the single space may have a volume of 10 μL or less.

The chamber may have a plurality of through holes in which the sample solution is to be filled, and each of the plurality of through holes may have a volume of at least 100 pL or higher.

At least one of the plurality of through holes may have a circular or polygonal prism shape and may be formed to pass through the gene amplification chip in a direction from the cover layer toward the bottom layer.

The cover layer may further include a first channel that allows the sample solution to flow into the plurality of through holes, and a solution outlet configured to discharge the sample solution that remains in the first channel, is discharged.

The bottom layer may include an oil inlet through which oil is to be injected, and a second channel configured to contain the oil.

The cover layer, the chamber layer, and the bottom layer are formed separately, or at least two successive layers of wherein the cover layer, the chamber layer, and the bottom layer are integrally formed.

An apparatus including the gene amplification chip may include: a light source configured to emit the light onto the gene amplification chip to heat the sample solution, to cause the amplification reaction to occur in the chamber.

The apparatus may further include a temperature sensor disposed on a surface of the photothermal film or at a portion of the outer surface of the bottom layer, at which the photothermal film is not disposed, and configured to measure temperature of the photothermal film or the bottom layer.

The temperature sensor may include at least one of an infrared sensor or a thermocouple.

The apparatus may include a light source controller configured to control at least one of on and off, a light intensity, a light emission time, and a light emission period of the light source, based on the temperature measured by the temperature sensor.

According to another aspect of the present disclosure, an apparatus for bio-particle analysis, may include: a gene amplification chip configured to perform gene amplification on a sample solution; a light source configured to emit light onto the gene amplification chip to heat the sample solution, to allow the gene amplification to occur in the gene amplification chip; a detector configured to detect a signal generated in response to occurrence of the gene amplification of the sample solution; and a processor configured to analyze bio-particles based on the detected signal, wherein the gene amplification chip may include: a cover layer having a solution inlet through which the sample solution is to be injected; a chamber layer disposed on one surface of the cover layer and having a chamber to receive the sample solution when the sample solution is injected through the solution inlet such that an amplification reaction of the solution occurs in the chamber; a bottom layer disposed on another surface of the chamber layer; and a photothermal film attached to an outer surface of the bottom layer, and configured to convert the light that is received from the light source, into the heat to heat the sample solution received in the chamber.

The apparatus may further include: a temperature sensor disposed on a surface of the photothermal film or at a portion of an outer surface of the chamber layer, at which the photothermal film is not disposed, and configured to measure temperature of the photothermal film or the chamber layer; and a light source controller configured to control at least one of on and off, a light intensity, a light emission time, and a light emission period of the light source, based on the temperature measured by the temperature sensor.

According to another aspect of the present disclosure, a non-transitory computer readable storage medium which is, when executed by at least on processor, configured to perform a method of controlling an apparatus for bio-particle analysis, is provided. The method may include: controlling a gene amplification chip to perform gene amplification on a sample solution, wherein a photothermal film is attached to the gene amplification chip; controlling a light source to emit light onto the photothermal film of the gene amplification to cause the photothermal film to convert the light to heat and thereby to heat the sample solution; detecting a signal generated from the gene amplification chip in response to the gene amplification of the sample solution occurring by the heat; and analyzing bio-particles based on the detected signal.

BRIEF DESCRIPTION OF THE DRAWINGS

The above and/or other aspects will be more apparent by describing certain example embodiments, with reference to the accompanying drawings, in which:

FIGS. 3A, 3B, 3C, and 3D are diagrams illustrating another example of the gene amplification chip of FIG. 1, among which FIGS. 3B and 3C are diagrams illustrating a structure and an effect of an auxiliary channel;

Figure 1:
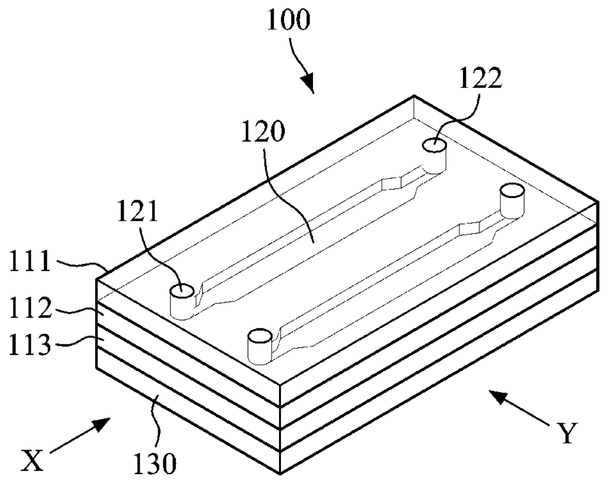
FIG. 1 is a diagram illustrating a structure of a gene amplification chip according to an embodiment of the present disclosure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

It will be understood that, although the terms first, second, etc. may be used herein to describe various elements, these elements should not be limited by these terms. These terms are only used to distinguish one element from another. Any references to singular may include plural unless expressly stated otherwise. In addition, unless explicitly described to the contrary, an expression such as "comprising" or "including" will be understood to imply the inclusion of stated elements but not the exclusion of any other elements. Also, the terms, such as 'unit' or 'module', etc., should be understood as a unit that performs at least one function or operation and that may be embodied as hardware, software, or a combination thereof.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

FIG. 1 is a diagram illustrating a structure of a gene amplification chip according to an embodiment of the present disclosure.

Referring to FIG. 1, a gene amplification chip 100 may include a cover layer 111, a chamber layer 112, a bottom layer 113, and a photothermal film 130.

As illustrated herein, the cover layer 111 may be disposed on the top of the gene amplification chip 100, the chamber layer 112 is disposed beneath the cover layer 111, and the bottom layer 113 may be disposed beneath the chamber layer 112, so that the chamber layer 112 is provided between the cover layer 111 and the bottom layer 113. The cover layer 111, the chamber layer 112, and the bottom layer 113 may be manufactured separately and thereafter combined to form a single gene amplification chip 100. Alternatively, at least two successive layers (e.g., the chamber layer 112 and the bottom layer 113) may be integrally formed to be combined with a remaining layer to form a single gene amplification chip 100.

A sum of thicknesses of the chamber layer 112 and the bottom layer 113 may be 1 mm or less. However, the chamber layer 112 and the bottom layer 113 are not limited thereto, and a total thickness or the respective thicknesses of the two layers 112 and 113 may be changed variously by considering thermal conductivity of materials used as the chamber layer 112 and the bottom layer 113 and the like.

The cover layer 111, the chamber layer 112, and the bottom layer 113 may be formed of materials having different thermal conductivities. For example, thermal conductivities of the materials used may gradually increase in the order of the cover layer 111, the chamber layer 112, and the bottom layer 113. Alternatively, at least two layers may be formed of materials with the same or similar thermal conductivity. For example, the cover layer 111 may be formed of a material having thermal conductivities of 0 to 10 W/m/° C., and the chamber layer 112 and the bottom layer 113 may be made of materials having relatively higher thermal conductivities of 100 to 1000 W/m/° C. than the cover layer 111.

For example, the cover layer 111 may be formed of materials, such as silicon, metal, glass, polymer, and the like. The chamber layer 112 and/or the bottom layer 113 may be formed of materials having a high thermal conductivity, such as silicon, metal, polymer, and the like. However, the materials are not limited thereto, and the respective layers 111, 112, and 113 may be formed of an inorganic matter, such as ceramic, graphite, etc., acrylic material, polyethylene terephthalate (PET), polycarbonate, polystylene, polypropylene, and the like.

The cover layer 111 may have a solution inlet 121 through which a sample solution is injected, and a solution outlet 122 through which the sample solution is discharged. The solution inlet 121 and the solution outlet 122 may be formed in a circular shape, an elliptical shape, a polygonal shape, and the like. The solution outlet 122 may include an absorption pad. The absorption pad allows the solution to be moved and drained by capillary action. By providing the absorption pad, a transfer speed of the solution may be easily controlled.

In particular, the sample may be one or a duplex of two or more of ribonucleic acid (RNA), deoxyribonucleic acid (DNA), peptide nucleic acid (PNA), and locked nucleic acid (LNA), oligopeptide, protein, toxin, etc., but is not limited thereto. The sample solution may be bio-fluids, including at least one of respiratory secretions, blood, urine, perspiration, tears, saliva, etc., or a swab sample of the upper respiratory tract, or a solution of the bio-fluid or the swab sample dispersed in other medium. In this case, the other medium may include water, saline solution, alcohol, phosphate buffered saline solution, vital transport media, etc., but is not limited thereto.

A chamber 120 formed in the chamber layer 112 may be a single chamber having one inner space. In this case, the chamber 120 may have a volume of 10 μL or less. Alternatively, the chamber 120 may be a multi-chamber having a plurality of spaces, in which case a volume of each space may be in a range of 100 pL to 10 μL. One or more chambers 120 may be formed in the chamber layer 112, and in the case where a plurality of chambers 120 are formed, the respective chambers 120 may have the same volume, or at least some of the chambers 120 may have different volumes.

The solution loaded through the solution inlet 121 may be introduced into the chamber 120 by capillary action. However, the method of moving the solution is not limited thereto, and the gene amplification chip 100 may further include a structure for moving the solution, such as an active/passive driving device, an electro-wetting device, and the like. In this case, the active/passive driving device may include a passive vacuum void pump, a syringe pump, a vacuum pump, a pneumatic pump, etc., but is not limited thereto.

When the sample solution introduced through the solution inlet 121 is filled in the chamber 120, gene amplification may occur in the chamber 120. In this case, reverse transcription of an RNA sample may be performed in the chamber 120 by using a reverse transcriptase. The gene amplification may include, for example, a nucleic acid amplification reaction including at least one of polymerase chain reaction (PCR) amplification and isothermal amplification, a redox reaction, a hydrolytic reaction, and the like.

In addition, before the gene amplification occurs in the chamber 120, a pretreatment process, such as heating, chemical treatment, treatment with magnetic beads, solid phase extraction, treatment with ultrasonic waves, etc., may be performed on the sample solution.

A filter for passing only a fluid while blocking fine particles in the sample solution may be disposed between the solution inlet 121 and the chamber 120 and/or between the chamber 120 and the solution outlet 122.

The filter may be made of, for example, silicon, polyvinylidene fluoride (PVDF), polyethersulfone, polycarbonate, glass fiber, Polypropylene, Cellulose, Mixed cellulose esters, Polytetrafluoroethylene (PTFE), Polyethylene Terephthalate, Polyvinyl chloride (PVC), Nylon, Phosphocellulose, Diethylaminoethyl cellulose (DEAE), etc., but is not limited thereto. Holes may have various shapes, e.g., a circular shape, a rectangular shape, a slit shape, an irregular shape due to glass fiber, and the like.

A valve for controlling a flow of the sample solution may be further disposed between the solution inlet 121 and the chamber 120 and/or between the chamber 120 and the solution outlet 122. The valve may be various types of microvalves. For example, the valve may include an active microvalve, such as a pneumatic/thermopneumatic actuated microvalve, an electrostatically actuated microvalve, a piezoelectrically actuated microvalve, an electromagnetically actuated microvalve, etc., or a passive microvalve which is opened and closed by a system according to a fluid flow direction or an interfacial tension difference and the like without artificial external action, but is not particularly limited thereto.

The photothermal film 130 having, for example, a planar shape, may be attached to an outer surface of the bottom layer 113. For example, the photothermal film 130 may be attached to all or a portion of the outer surface of the bottom layer 113 by patterning or deposition. In this case, the deposition may include chemical vapor deposition (CVD), physical vapor deposition (PVD), atomic layer deposition (ALD), sputtering, evaporation, etc., but is not limited thereto.

The photothermal film 130 may have a thickness of 500 μm or less. However, the thickness of the photothermal film 130 is not limited thereto, and may be changed variously in consideration of physical properties of a material used as the photothermal film 130, such as thermal conductivity, heat retention rate, and the like. The photothermal film 130 may be formed of a material, such as polymer, metal, metal oxide, nanocomposite, nanostructure, semiconductor, and the like. A polyimide (PI) film, having a relatively lower thermal conductivity than metal but having a high heat retention rate, may be used. However, the material is not limited thereto, and a gold (Au) film or an aluminum nanostructure (AINS) may also be used.

Figure 2A:
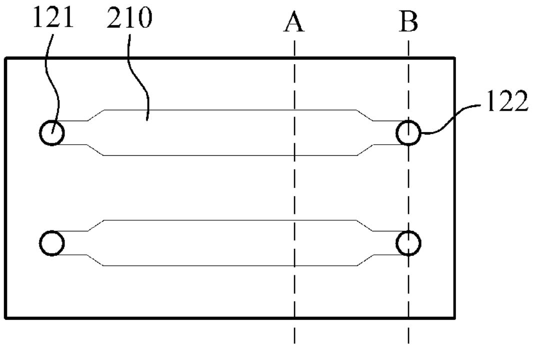
FIGS. 2A to 2D are diagrams illustrating an example of the gene amplification chip of FIG. 1.
Figure 2B:
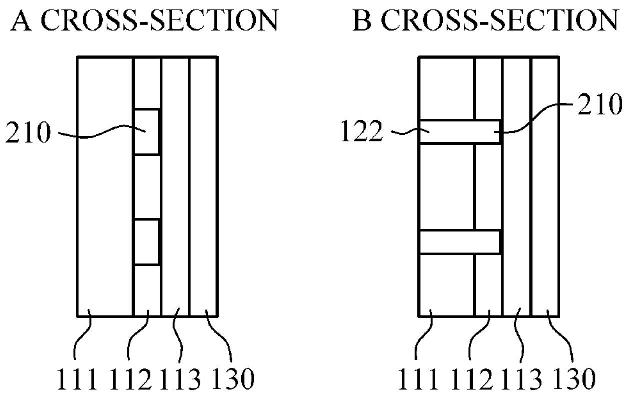
Figure 2C:
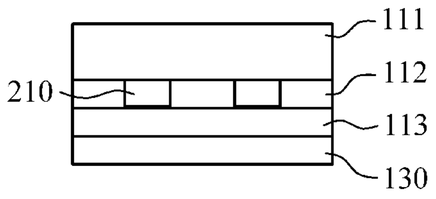
Figure 2D:
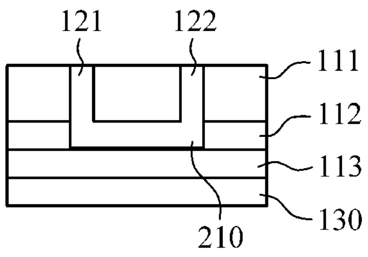

FIGS. 2A to 2D are diagrams illustrating an example of the gene amplification chip 100 of FIG. 1. FIG. 2A is a plan view as seen from above, FIG. 2B illustrates cross-sections A and B; FIG. 2C is a cross-section of a center portion as seen in direction X of FIG. 1; and FIG. 2D is a cross-section of a center portion as seen in direction Y of FIG. 1.

Referring to FIGS. 2A to 2D, the gene amplification chip 100 according to an embodiment may include the chamber 120 formed as a single space 210. In this case, the single space 210 may have a volume of 10 μL or less. When a sample solution injected through the solution inlet 121 is stored in the single space 210, and light emitted by a light source is converted into heat by the photothermal film 130 and is transferred to the chamber layer 112, the sample solution stored in the single space 210 is heated such that gene amplification may occur.

Figure 3A:
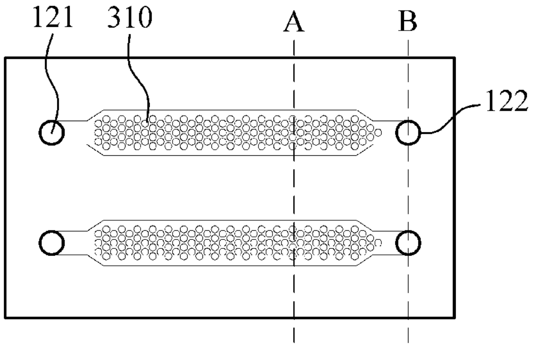
Figure 3B:
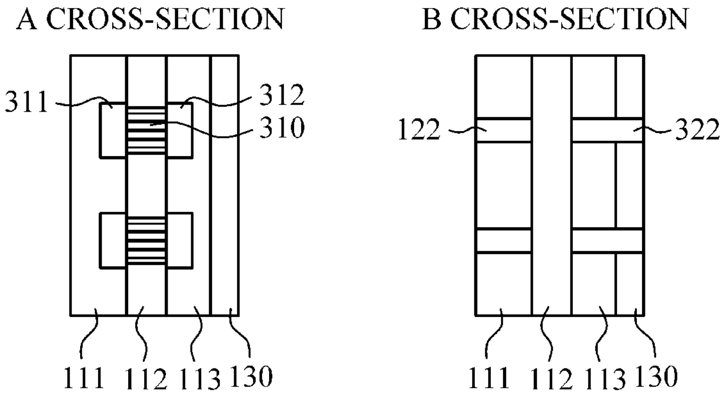
Figure 3C:
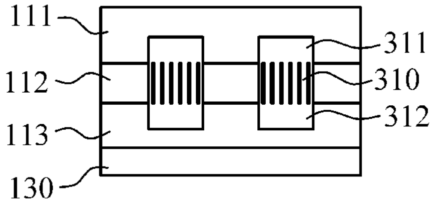
Figure 3D:
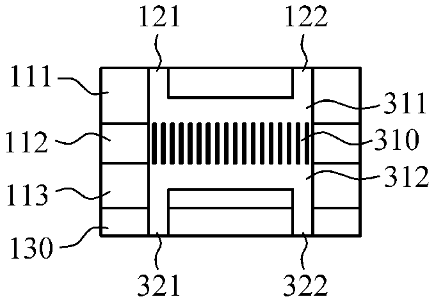
Figure 4A:
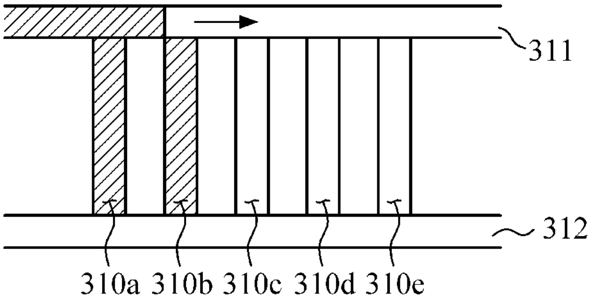
FIGS. 4A and 4B are diagrams explaining an example of injecting a sample solution into a plurality of through holes.
Figure 4B:
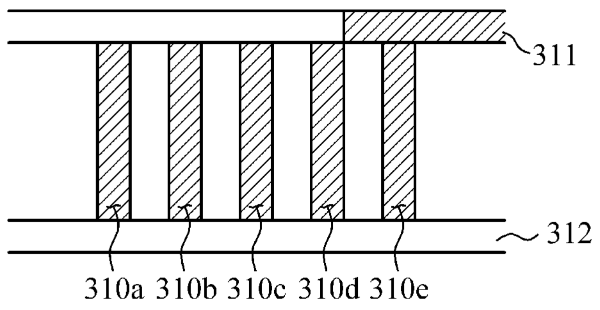

FIGS. 3A to 3D are diagrams illustrating another example of the gene amplification chip 100 of FIG. 1. FIG. 3A is a plan view as seen from above, FIG. 3B illustrates cross-sections A and B; FIG. 3C is a cross-section of a center portion as seen in direction X of FIG. 1; and FIG. 3D is a cross-section of a center portion as seen in direction Y of FIG. 1. FIGS. 4A and 4B are diagrams explaining an example of injecting a sample solution into a plurality of through holes.

Referring to FIGS. 3A to 3D, the chamber 120 may have a plurality of spaces, in which case the respective spaces may be through holes 310 formed to pass through the gene amplification chip in a direction from the cover layer 111 toward the bottom layer 113. The number of through holes 310 is not particularly limited. The through holes 310 may have a volume of 100 pL to 10 μL. The through holes 310 may have a circular or polygonal prism shape. In the case where a plurality of chambers 120 are formed in the chamber layer 112, the number of through holes 310 included in the respective chambers 120 may be the same for all the chambers 120, or may be different for at least some of the chambers 120. In addition, the through-holes 310 of at least some of the chambers 120 may have a different volume from the volume of the through holes 310 included in the other chambers 120, and even in any one chamber 120, at least some through holes 310 may have a different volume from the volume of the other through holes 310.

The cover layer 111 may include the solution inlet 121 through which a sample solution is injected, the solution outlet 122 through which the sample solution is discharged, and a first channel 311 for the sample solution, injected through the solution inlet 121, to flow into the through holes 310.

Referring to FIGS. 4A and 4B, the sample solution loaded through the solution inlet 121, may flow along the first channel 311 by capillary action to be sequentially filled in through holes 310*a*, 310*b*, 310*c*, 310*d*, and 310*e*. When the sample solution is filled in all the through holes 310*a*, 310*b*, 310*c*, 310*d*, and 310*e*, the solution remaining in the first channel 311 may be discharged through the solution outlet 122. In this case, when the sample solution is filled in the plurality of through holes 310*a*, 310*b*, 310*c*, 310*d*, and 310*e*, oil is injected into the first channel 311 through the solution inlet 121 to be filled in the first channel 311, such that the sample solution remaining in the first channel 311 may be discharged through the solution outlet 122.

Referring back to FIGS. 3A to 3D, the bottom layer 113 may include an oil inlet 321 through which oil is injected, an oil outlet 322 through which the oil is discharged, and a second channel 312 in which the oil, injected through the oil inlet 321, is filled. When the sample solution, injected through the solution inlet 121, flows along the first channel 311 to be filled in the through holes 310 of the chamber 120, the oil may be injected into the second channel 312 through the oil inlet 321. As described above, by filling the oil in the first channel 311 and/or the second channel 312, the sample solution, injected into the through holes 310, may be prevented from being evaporated during thermal cycling, and contact between the sample solution and gas may be prevented.

FIGS. 5A to 5E are diagrams illustrating various examples of an apparatus for gene amplification including a gene amplification chip. FIGS. 6A and 6B are diagrams illustrating temperature cycles generated by controlling a light source.

Figure 5A:
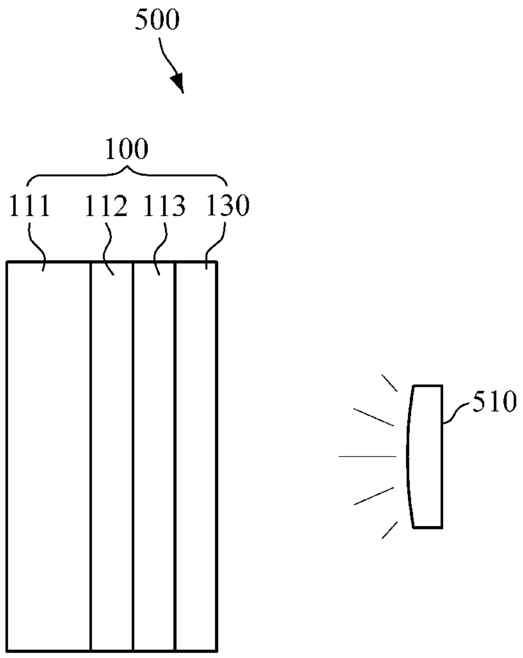
FIGS. 5A, 5B, 5C, 5D, and 5E are diagrams illustrating various examples of an apparatus for gene amplification including a gene amplification chip.
Figure 6A:
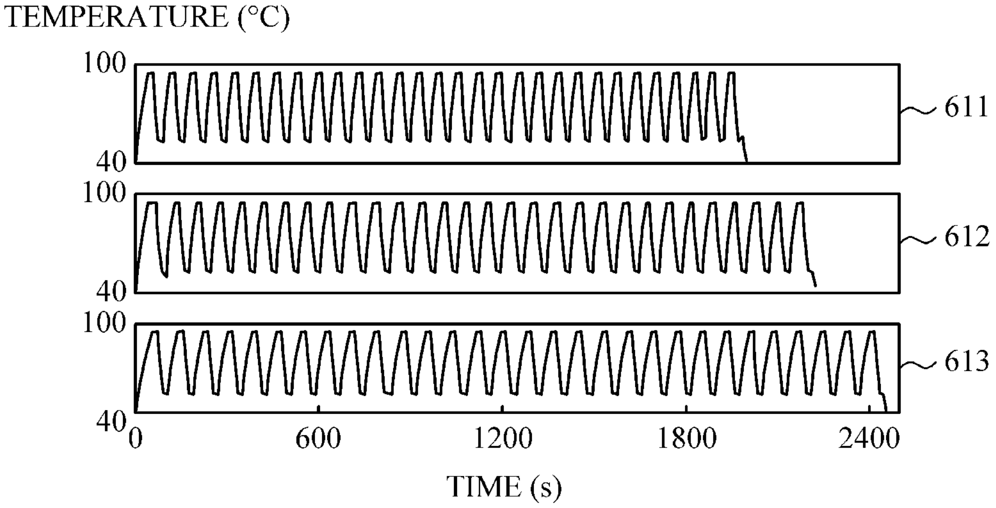
FIGS. 6A and 6B are diagrams illustrating temperature cycles generated by controlling a light source.
Figure 6B:
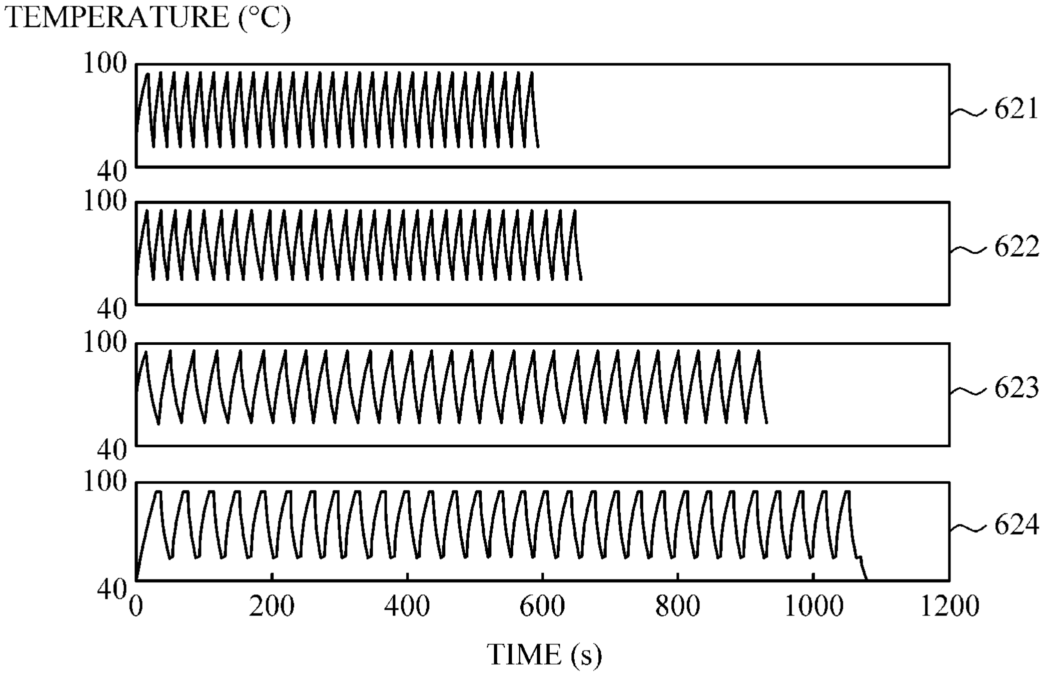

Referring to FIG. 5A, an apparatus 500 for gene amplification according to an embodiment may include the gene amplification chip 100 and a light source 510. Various embodiments of the gene amplification chip 100 are described above, such that a detailed description thereof will be omitted.

A light source 510 may emit light onto a surface of the photothermal film 130 to heat the sample solution stored in the chamber layer 112. The light source 510 may be disposed in the same direction as the photothermal film 130 with respect to the chamber layer 112. The light source 510 may be any one of a light emitting diode (LED), vertical-cavity surface-emitting laser (VCSEL), a laser diode (LD), a tungsten lamp, a fluorescent lamp, a halogen lamp, a mercury lamp, a xenon lamp, and a metal-halide lamp, or a combination thereof. However, the light source 510 is not limited thereto. The light source 510 may emit light in a visible to infrared wavelength range, and a proper wavelength may be determined depending on a photothermal film.

When the light source 510 emits light onto the surface of the photothermal film 130, the heat converted by the photothermal film 130 may be transferred rapidly to the sample solution, stored in the chamber, through the bottom layer 113 and the chamber layer 112 having high thermal conductivity. Instead of providing the photothermal film 130 in the chamber or in the chamber layer 112 or the bottom layer 113, the photothermal film 130 is attached to the outer surface of the bottom layer 113, such that the light emitted by the light source 510 is directly absorbed into the photothermal film 130, thereby improving light-to-heat conversion efficiency.

Figure 5B:
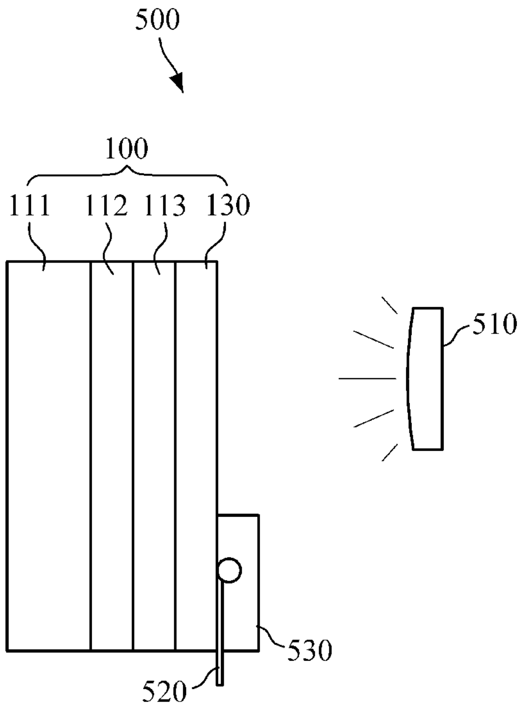
Figure 5C:
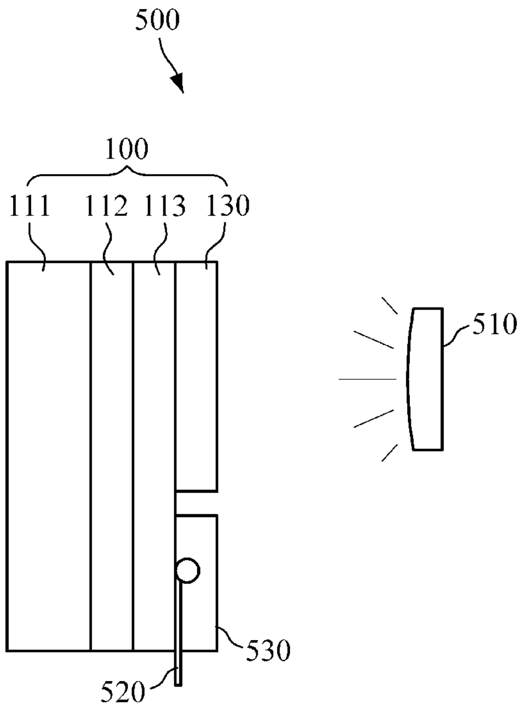

Referring to FIGS. 5B and 5C, the apparatus 500 for gene amplification according to other embodiments may further include a temperature sensor 520. In this case, the photothermal film 130 may be attached to the entire outer surface of the bottom layer 113 as illustrated in FIG. 5B, or may be attached to a portion of the outer surface of the bottom layer 113 as illustrated in FIG. 5C.

The temperature sensor 520 may measure temperature of the gene amplification chip 100. In this case, the temperature sensor 520 may include a thermocouple, an infrared sensor, etc., but is not limited thereto.

As illustrated in FIG. 5B, the temperature sensor 520 may be disposed in a thermal pad 530 having high thermal conductivity, to be attached to the photothermal film 130 through the thermal pad 530, and may measure temperature of the photothermal film 130 converted by the light of the light source 510. Alternatively, as illustrated in FIG. 5C, the temperature sensor 520 may be disposed in the thermal pad 530 having high thermal conductivity to be attached to an outer surface of the bottom layer 113, on which the photothermal film 130 is not attached, through the thermal pad 530, and may measure temperature of the bottom layer 113 heated by heat conduction from the photothermal film 130 converted by the light of the light source 510.

Figure 5D:
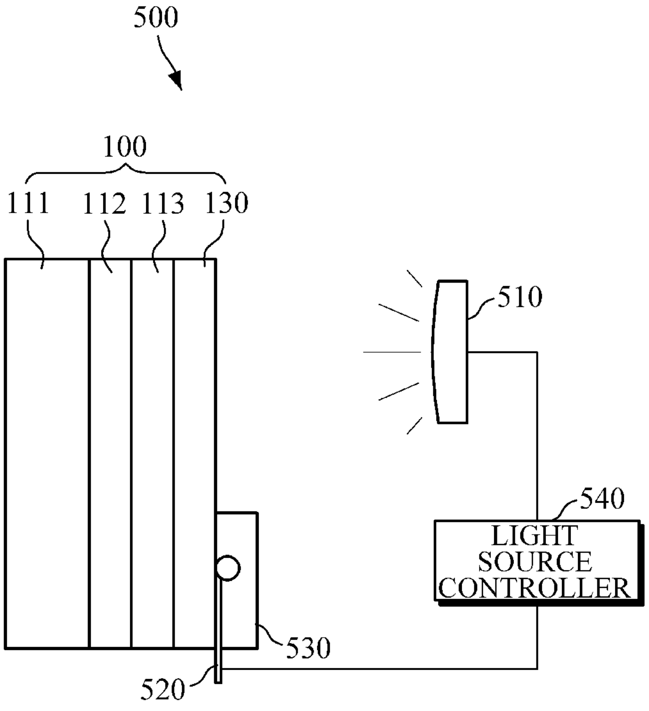
Figure 5E:
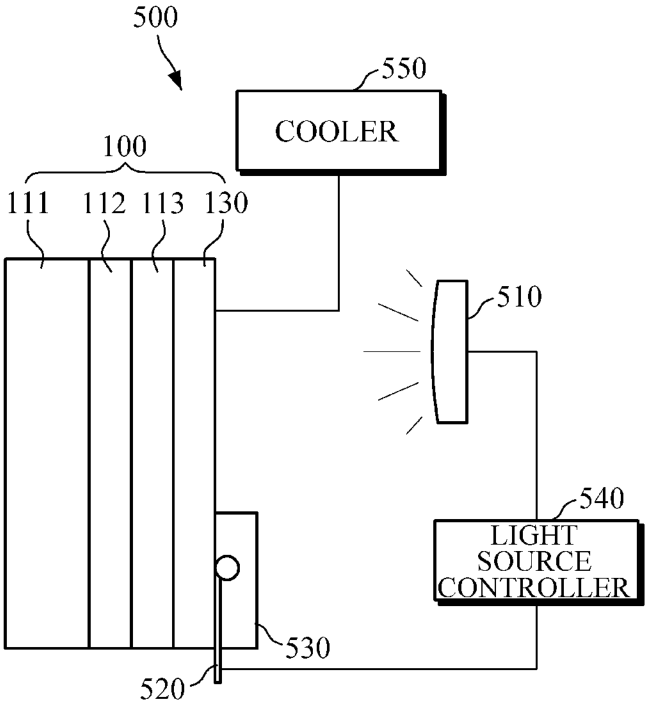

Referring to FIG. 5D, the apparatus 500 for gene amplification according to another embodiment may further include a light source controller 540, and referring to FIG. 5E, the apparatus 500 for gene amplification according to yet another embodiment may further include the light source controller 540 and a cooler 550.

The light source controller 540 may control On/Off, light intensity, light emission time, light emission period, and the like of the light source 510. In this case, the light intensity may be controlled by an intensity of an applied current or voltage. The controlling of the light emission time may include controlling an emission method such as pulse emission and continuous emission. The controlling of the light emission period may include controlling On/Off of the light source.

The light source controller 540 may control the light source 510 to heat and cool the photothermal film 130, such that thermal cycling may occur, and a gene may be amplified in the chamber 112. In this case, cooling may be performed by natural convection, and the photothermal film 130 may be cooled by the cooler 550 as illustrated in FIG. 5E. In this case, the cooler 550 may include a fan and the like. Based on the temperature measured by the temperature sensor 520, the light source controller 540 may control the light source 510 according to a temperature profile. The temperature profile may be preset through experiments, and may include information, such as temperature, holding time, number of times of cycle repetition, and the like.

For example, FIG. 6A is a diagram illustrating an example of performing thermal cycling 30 times in which the gene amplification chip 100 is heated by emitting light with a wavelength of 447 nm onto the surface of the photothermal film, and the gene amplification chip 100 is cooled by using a fan. In this case, a polyimide film 611, an aluminum nanostructure (AlNS) film 612, and a gold (Au) film 613 were used as the photothermal film. When denaturation was held at 95° C. for 15 seconds, followed by annealing at 55° C. for 15 seconds, it took a total time of 33.2 minutes for the polyimide film 611, 37 minutes for the AlNS film 612, and 40.8 minutes for the Au film 613.

In another example, FIG. 6B is a diagram illustrating an example of performing thermal cycling 30 times using the polyimide film as the photothermal film by reducing the holding time from 95° C. and 55° C. When the holding time for [denaturation, annealing] was [5 seconds, 5 seconds] 624, [1 second, 5 seconds] 623, and [1 second, 1 second] 622 and 621, it took a total time of 17.6 minutes, 15.5 minutes, 10.8 minutes, and 9.7 minutes, respectively. The example of FIG. 6B shows that a total time required for gene amplification may be reduced compared to the example of FIG. 6A.

Figure 7:
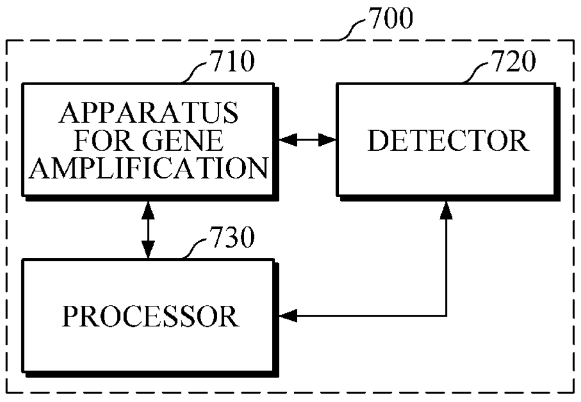
FIG. 7 is a block diagram illustrating an apparatus for bio-particle analysis according to an embodiment of the present disclosure.

FIG. 7 is a block diagram illustrating an apparatus for bio-particle analysis according to an embodiment of the present disclosure.

Referring to FIG. 7, an apparatus 700 for bio-particle analysis includes an apparatus 710 for gene amplification, a detector 720, and a processor 730. The apparatus 710 for gene amplification includes the above embodiments of the apparatus 500 for gene amplification, such that the following description will be focused on non-redundant parts.

The detector 720 may detect a signal generated by the apparatus 710 for gene amplification while or after gene amplification is performed by the apparatus 710 for gene amplification. In this case, the signal may include fluorescence signal, phosphor signal, absorbance signal, surface plasmon resonance signal, Raman signal, and the like.

The detector 720 may include a photomultiplier tube, a photo detector, a photomultiplier tube array, a photo detector array, a complementary metal-oxide semiconductor (CMOS) image sensor, etc., but is not limited thereto. In addition, the detector 720 may further include a filter for passing light of a specific wavelength, a mirror for directing the light radiating from the apparatus 710 for gene amplification, a lens for collecting light radiating from the apparatus 710 for gene amplification, and the like.

The processor 730 may be electrically connected to the detector 720. In addition, the processor 730 may detect bio-particles by receiving and analyzing the signal detected by the detector. For example, the processor 730 may perform quantitative analysis of the bio-particles based on the detected signal using Poisson distribution, Surface-Enhanced Raman Spectroscopy (SERS), and the like based on the detected signal.

Figure 8:
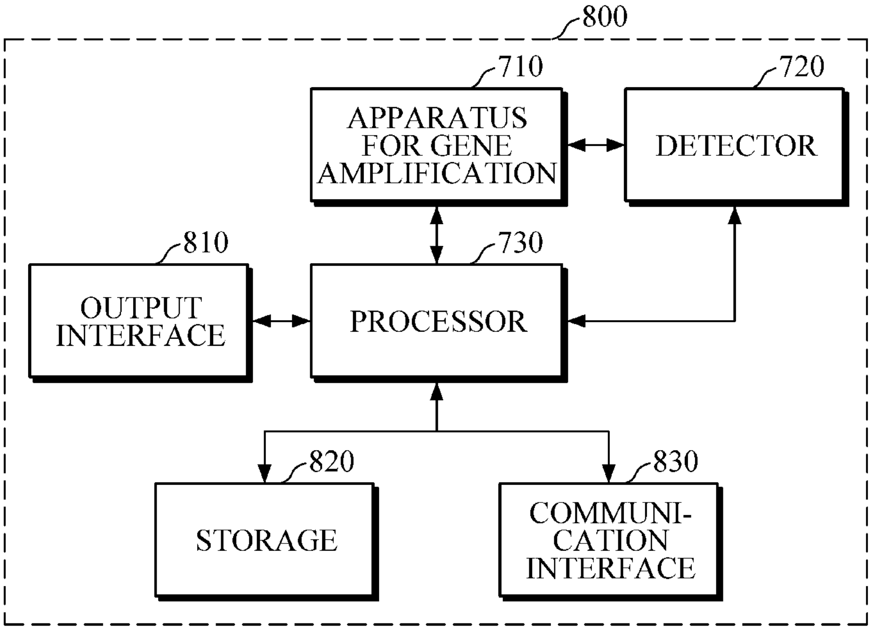
FIG. 8 is a block diagram illustrating an apparatus for bio-particle analysis according to another embodiment of the present disclosure.

FIG. 8 is a block diagram illustrating an apparatus for bio-particle analysis according to another embodiment of the present disclosure.

Referring to FIG. 8, an apparatus 800 for bio-particle analysis includes the apparatus 710 for gene amplification, the detector 720, the processor 730, an output interface 810, a storage 820, and a communication interface 830. The apparatus 710 for gene amplification, the detector 720, and the processor 730 are described in detail above, such that a description thereof will be omitted.

The output interface 810 may output processes or processing results, for example, a bio-particle analysis result, of the apparatus 710 for gene amplification, the detector 720, and/or the processor 730. The output interface 810 may provide a user with information by visual, audio, and tactile methods and the like using a visual output module (e.g. display), an audio output module (e.g., speaker), a haptic module, and the like.

The storage 820 may store various data required for the apparatus 710 for gene amplification, the detector 720, and/or the processor 730, and/or processing results thereof. The storage 820 may include at least one storage medium of a flash memory type memory, a hard disk type memory, a multimedia card micro type memory, a card type memory (e.g., an SD memory, an XD memory, etc.), a Random Access Memory (RAM), a Static Random Access Memory (SRAM), a Read Only Memory (ROM), an Electrically Erasable Programmable Read Only Memory (EEPROM), a Programmable Read Only Memory (PROM), a magnetic memory, a magnetic disk, and an optical disk, and the like, but is not limited thereto.

The communication interface 830 may communicate with an external device to transmit and receive various data required for the apparatus 710 for gene amplification, the detector 720, and/or the processor 730, and/or processing results thereof. In this case, the external device may be medical equipment, a printer to print out results, or a display device. In addition, the external device may be a digital TV, a desktop computer, a mobile phone, a smartphone, a tablet PC, a laptop computer, Personal Digital Assistants (PDA), Portable Multimedia Player (PMP), a navigation device, an MP3 player, a digital camera, a wearable device, etc., but is not limited thereto.

The communication interface 830 may communicate with the external device by using communication techniques, such as Bluetooth communication, Bluetooth Low Energy (BLE) communication, Near Field Communication (NFC), WLAN communication, Zigbee communication, Infrared Data Association (IrDA) communication, Wi-Fi Direct (WFD) communication, Ultra-Wideband (UWB) communication, Ant+ communication, WIFI communication, Radio Frequency Identification (RFID) communication, 3G, 4G, and 5G communications, and the like. However, this is merely exemplary and is not intended to be limiting.

Figure 9:
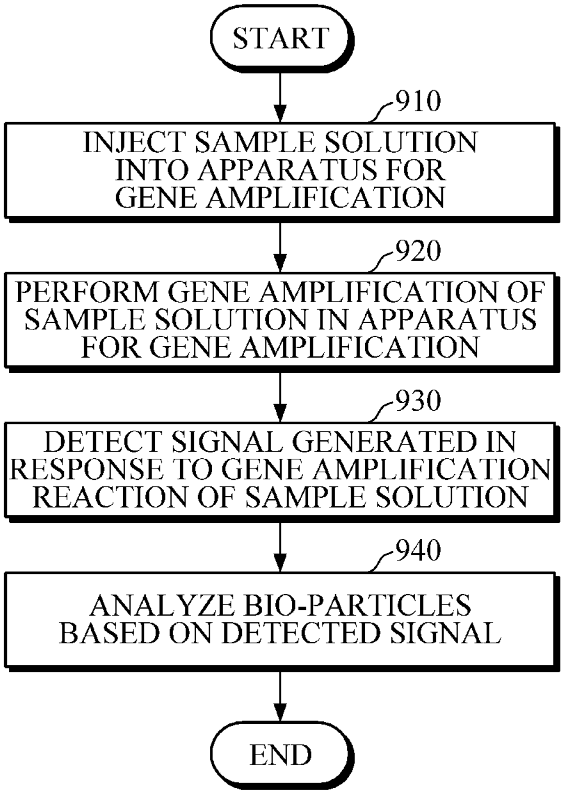
FIG. 9 is a flowchart illustrating a method of bio-particle analysis according to an embodiment of the present disclosure.

FIG. 9 is a flowchart illustrating a method of bio-particle analysis according to an embodiment of the present disclosure.

The method of FIG. 9 may be performed by the apparatus 700 or 800 for bio-particle analysis of FIG. 7 or FIG. 8, which will be briefly described below.

First, a sample solution is injected through the solution inlet formed in the cover layer of the gene amplification chip in operation 910. In this case, a pretreatment process, such as heating, chemical treatment, treatment with magnetic beads, solid phase extraction, treatment with ultrasonic waves, etc., may be performed on the sample solution.

Then, when the sample solution is filled in the chamber of the gene amplification chip, gene amplification is performed in the chamber in operation 920. In this case, if the sample solution is an RNA sample, reverse transcription of the RNA sample may be performed by using a reverse transcriptase. The enzyme reaction may include, for example, a nucleic acid amplification reaction including at least one of polymerase chain reaction (PCR) amplification and isothermal amplification, a redox reaction, a hydrolytic reaction, and the like. In this case, when light is emitted onto the photothermal film, attached to an outer surface of the bottom layer of the gene amplification chip, by using the light source of the apparatus for gene amplification, heat converted by the photothermal film may heat the sample solution in the chamber. The bottom layer, having the photothermal film attached thereto, in the gene amplification chip may be formed of a material having high thermal conductivity. By controlling the light source using the temperature sensor and the light source controller, included in the apparatus for gene amplification, according to a temperature profile, the apparatus for gene amplification may perform thermal cycling for heating or cooling the photothermal film, such that an amplification reaction of the sample solution may occur in the chamber of the gene amplification chip. In this case, the apparatus for gene amplification may include the cooler, and may rapidly cool the photothermal film by using the cooler.

Subsequently, the detector of the apparatus for bio-particle analysis may detect a signal, generated in response to the gene amplification reaction of the sample solution in the chamber of the gene amplification chip in operation 930. In this case, the signal may include fluorescence signal, phosphor signal, absorbance signal, surface plasmon resonance signal, Raman signal, and the like.

Next, the processor of the apparatus for gene amplification may analyze bio-particles based on the detected signal in operation 940. For example, the processor may analyze substance information, a degree of amplification, and the like of the bio-particles based on the detected signal by using Poisson distribution, Surface-Enhanced Raman Spectroscopy (SERS), and the like.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A gene amplification chip comprising:

a cover layer having a solution inlet through which a sample solution to be injected;

a chamber layer disposed on one surface of the cover layer, and having a chamber configured to receive the sample solution when the sample solution is injected through the solution inlet such that an amplification reaction of the sample solution occurs in the chamber;

a bottom layer disposed on another surface of the chamber layer; and a photothermal film having a planar shape attached to an outer surface of the bottom layer, and configured to convert light into heat to heat the sample solution received in the chamber.

2. The gene amplification chip of claim 1, wherein the photothermal film is formed as a flat surface and is attached to all or a portion of the outer surface of the bottom layer.

3. The gene amplification chip of claim 1, wherein the photothermal film has a thickness of 500 μm or less.

4. The gene amplification chip of claim 1, wherein the photothermal film is formed of at least one of polymer, metal, metal oxide, nanocomposite, nanostructure, and semiconductor.

5. The gene amplification chip of claim 1, wherein the cover layer comprises at least one of silicon, metal, glass, and polymer.

6. The gene amplification chip of claim 1, wherein the chamber layer and the bottom layer are integrally formed using at least one of silicon, metal, and polymer, or are separately formed using different materials.

7. The gene amplification chip of claim 1, wherein a sum of a thickness of the chamber layer and a thickness of the bottom layer is 1 mm or less.

8. The gene amplification chip of claim 1, wherein the chamber has a single space to receive the sample solution therein, and the single space has a volume of 10 μL or less.

9. The gene amplification chip of claim 1, wherein the chamber has a plurality of through holes in which the sample solution is to be filled, and each of the plurality of through holes has a volume of at least 100 μL or higher.

10. The gene amplification chip of claim 9, wherein at least one of the plurality of through holes has a circular or polygonal prism shape and is formed to pass through the gene amplification chip in a direction from the cover layer toward the bottom layer.

11. The gene amplification chip of claim 9, wherein the cover layer further comprises a first channel that allows the sample solution to flow into the plurality of through holes, and a solution outlet configured to discharge the sample solution that remains in the first channel.

12. The gene amplification chip of claim 11, wherein the bottom layer comprises an oil inlet through which oil is to be injected, and a second channel configured to contain the oil.

13. The gene amplification chip of claim 1, wherein the cover layer, the chamber layer, and the bottom layer are formed separately, or at least two successive layers of wherein the cover layer, the chamber layer, and the bottom layer are integrally formed.

14. An apparatus comprising the gene amplification chip of claim 1, wherein the apparatus further comprises:

a light source configured to emit the light onto the gene amplification chip to heat the sample solution, to cause the amplification reaction to occur in the chamber.

15. The apparatus of claim 14, further comprising a temperature sensor disposed on a surface of the photothermal film or at a portion of the outer surface of the bottom layer, at which the photothermal film is not disposed, and configured to measure temperature of the photothermal film or the bottom layer.

16. The apparatus of claim 15, wherein the temperature sensor comprises at least one of an infrared sensor or a thermocouple.

17. The apparatus of claim 15, further comprising a light source controller configured to control at least one of on and off, a light intensity, a light emission time, and a light emission period of the light source, based on the temperature measured by the temperature sensor.

18. An apparatus for bio-particle analysis, the apparatus comprising:

a gene amplification chip configured to perform gene amplification on a sample solution;

a light source configured to emit light onto the gene amplification chip to heat the sample solution, to allow the gene amplification to occur in the gene amplification chip;

a detector configured to detect a signal generated in response to occurrence of the gene amplification of the sample solution; and a processor configured to analyze bio-particles based on the detected signal, wherein the gene amplification chip comprises:

a cover layer having a solution inlet through which the sample solution is to be injected;

a chamber layer disposed on one surface of the cover layer and having a chamber to receive the sample solution when the sample solution is injected through the solution inlet such that an amplification reaction of the solution occurs in the chamber;

a bottom layer disposed on another surface of the chamber layer; and a photothermal film having a planar shape attached to an outer surface of the bottom layer, and configured to convert the light that is received from the light source, into the heat to heat the sample solution received in the chamber.

19. The apparatus of claim 18, further comprising:

a temperature sensor disposed on a surface of the photothermal film or at a portion of an outer surface of the chamber layer, at which the photothermal film is not disposed, and configured to measure temperature of the photothermal film or the chamber layer; and a light source controller configured to control at least one of on and off, a light intensity, a light emission time, and a light emission period of the light source, based on the temperature measured by the temperature sensor.

20. A non-transitory computer readable storage medium which is, when executed by at least on processor, configured to perform a method of controlling an apparatus for bio-particle analysis, the method comprising:

controlling a gene amplification chip to perform gene amplification on a sample solution, wherein a photothermal film having a planar shape is attached to the gene amplification chip;

controlling a light source to emit light onto the photothermal film of the gene amplification to cause the photothermal film to convert the light to heat and thereby to heat the sample solution;

detecting a signal generated from the gene amplification chip in response to the gene amplification of the sample solution occurring by the heat; and analyzing bio-particles based on the detected signal.

* * * * *